Feb. 28, 1928.
F. L. OVERTON
LICENSE PLATE FRAME
Original Filed May 10, 1926
1,660,575
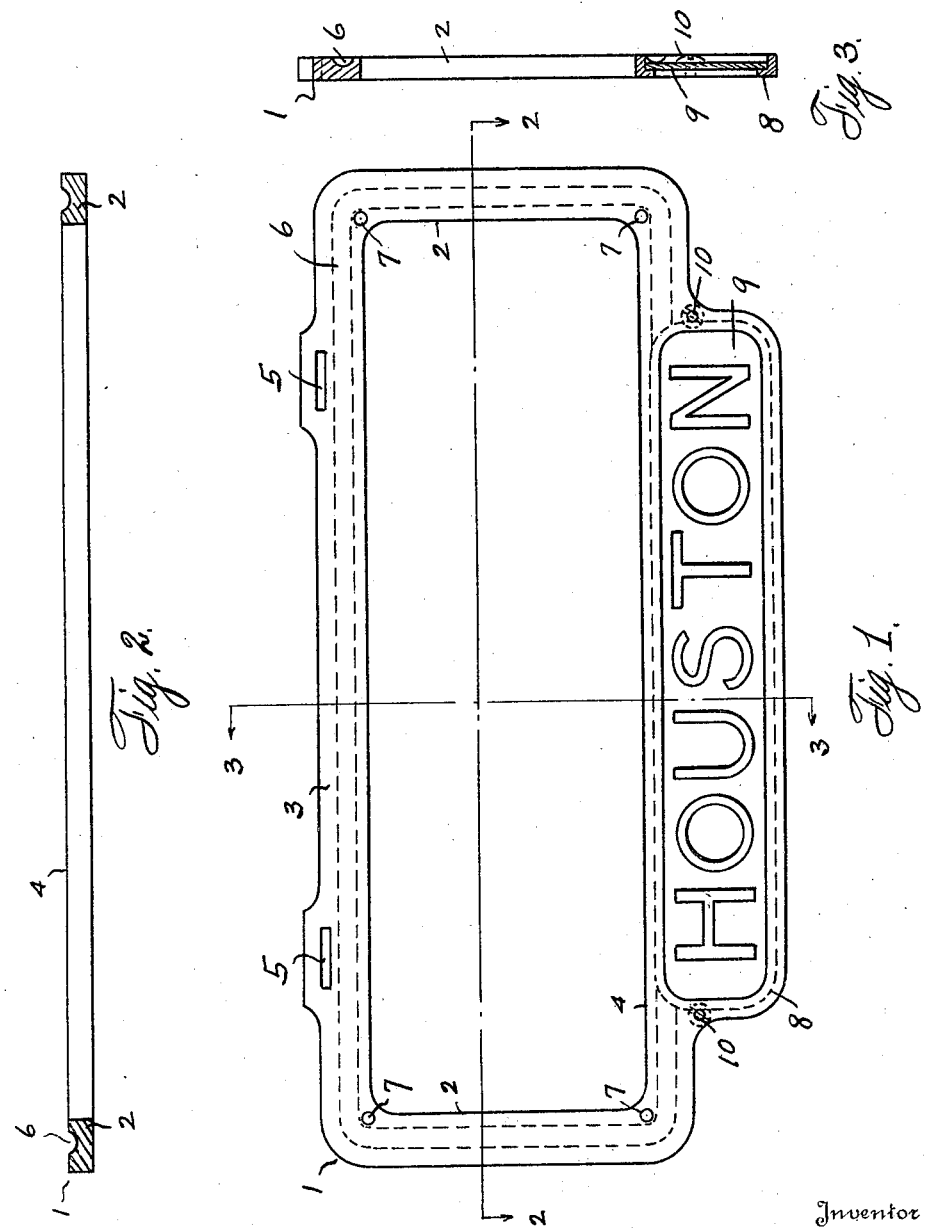
Inventor
Fitzhugh L. Overton
By
Hardway Cather
Attorneys Patented Feb. 28, 1928.

1,660,575

UNITED STATES PATENT OFFICE.

FITZHUGH L. OVERTON, OF HOUSTON, TEXAS.

LICENSE-PLATE FRAME.

Application filed May 10, 1926, Serial No. 108,010. Renewed January 9, 1928.

This invention relates to new and useful improvements in a license plate frame.

One object of the invention is to provide a frame of novel formation and particularly adapted for use in securing a license plate onto a motor vehicle.

Another object of the invention is to provide a frame of the character described which may be permanently fastened to a motor vehicle and of such design that a license plate, as well as a plate designating the home location of the vehicle, may be removably secured therein and whereby said plates may be protected from injury. The frame is also of such construction and form as to give an ornamental mounting for said plates.

With the above and other objects in view this invention has particular relation to certain novel features of construction, arrangement of parts and use, an example of which is given in this specification and illustrated in the accompanying drawings, wherein:—

Figure 1 shows a front elevation of the frame.

Figure 2 shows a sectional view thereof, taken on the line 2—2 of Figure 1, and

Figure 3 shows a sectional view taken on the line 3—3 of Figure 1.

Referring now more particularly to the drawings, wherein like numerals of reference designate similar parts in each of the figures the numeral 1 designates the license plate frame as a whole, which, preferably, is substantially rectangular in form. This frame is composed of the end bars 2, 2, and the side bars 3 and 4, said bars being joined integrally together. The upper bar 3 has the spaced slots 5, 5, to receive ties by means of which the frame may be permanently fastened to a motor vehicle. The end and side bars have a continuous groove 6 extending all the way around the license plate frame and designed to receive the marginal reinforcing rib which the ordinary motor vehicle license plate has and said license plate may be secured in the frame 1 by means of small bolts which pass through it and through the bolt holes 7 of said frame.

The lower bar 4 is formed into a smaller rectangular frame 8, integral therewith, the inner side of whose side and end bars are counter sunk to receive the rectangular name plate 9 which is removably secured therein by the end screws 10, 10. The upper edge of the name plate 9 underlies the plane of the groove 6 so that the lower edge of the license plate will overlap the upper edge of the name plate to secure said last named plate more firmly in position.

These frames will not only protect said plates against injury but will give them a more ornamental appearance.

What I claim is:—

A license plate frame formed of side and end bars integrally fastened together, one side of said frame having a continuous groove all the way around adapted to receive the marginal rib of a license plate, one of said bars being also formed into a rectangular frame which is counter sunk on one side to a plane beneath the plane of the groove, said counter sunk portion being adapted to receive a name plate, so that the edge of said name plate will underlie the adjacent edge of the license plate.

In testimony whereof I have signed my name to this specification.

FITZHUGH L. OVERTON.